(No Model.) 2 Sheets—Sheet 1.
R. V. R. SILL.
ELECTRIC RAILWAY.
No. 425,911. Patented Apr. 15, 1890.
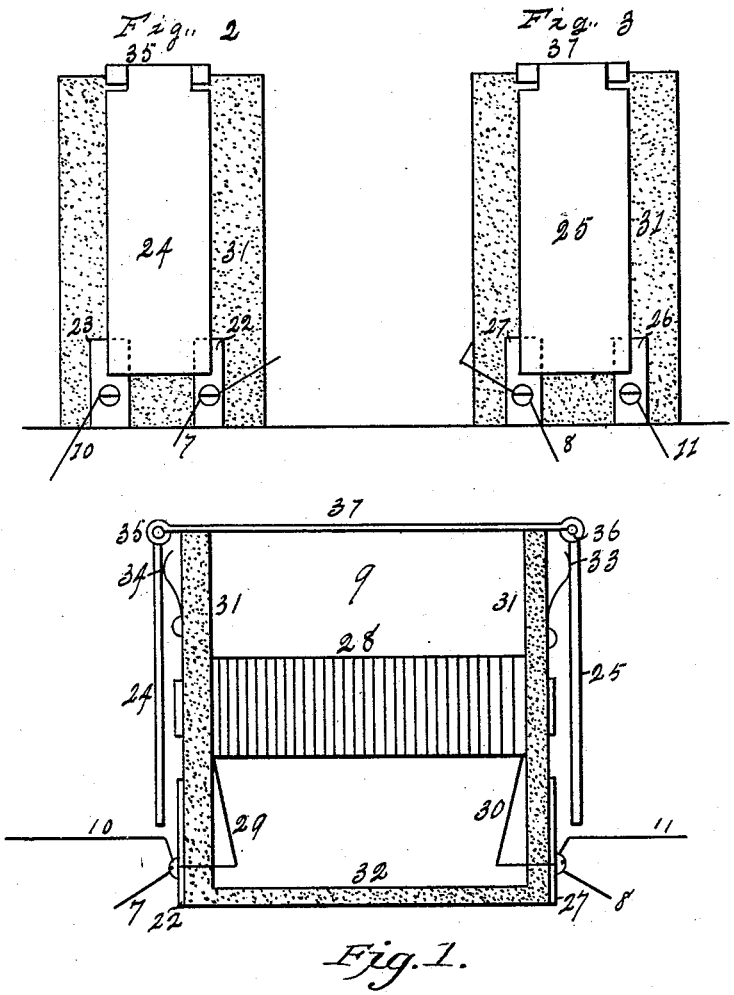
Witnesses
Adelaide A. Anderson
Geo. H. Lothrop
Inventor
Richard V. R. Sill

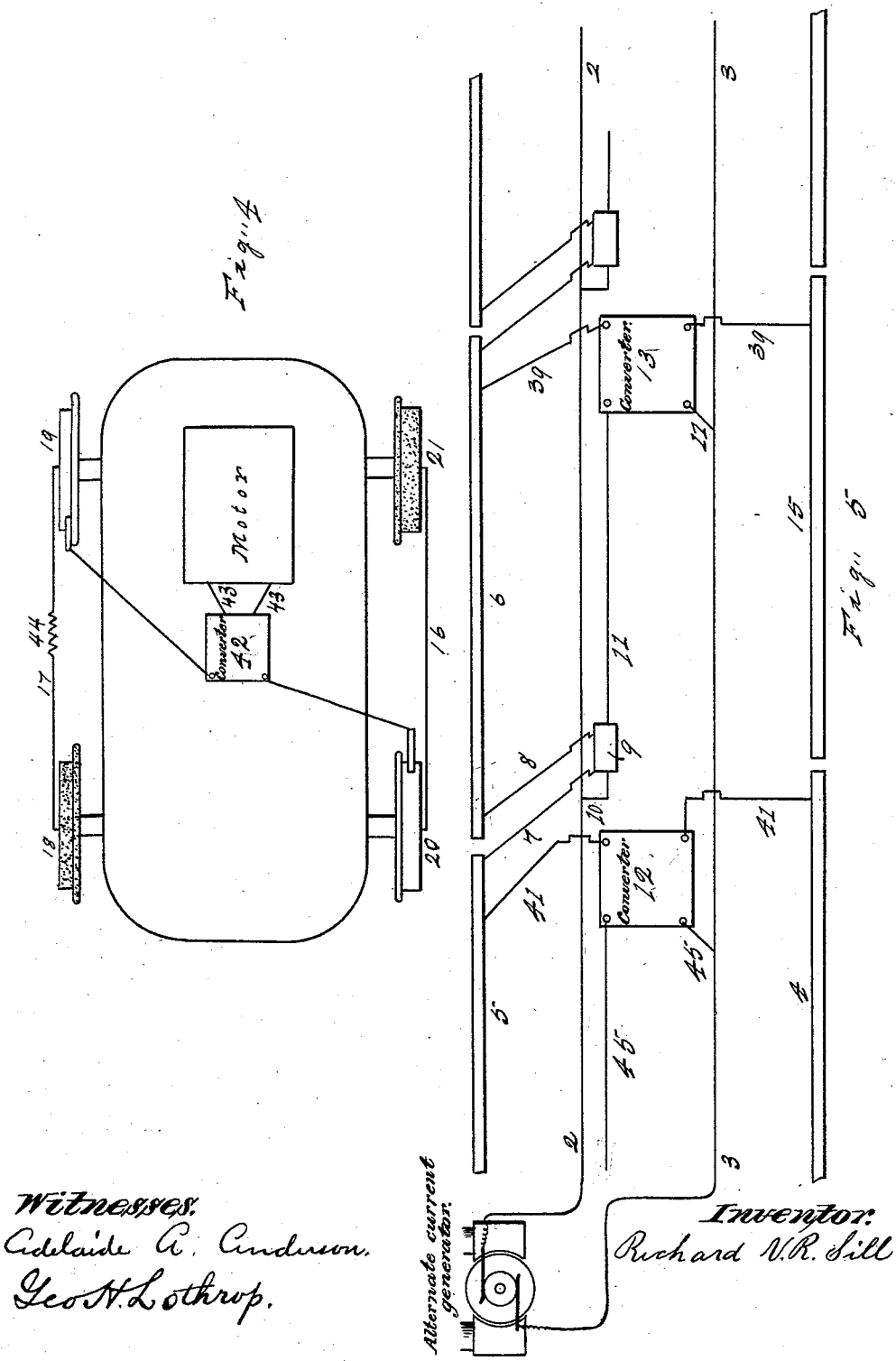

UNITED STATES PATENT OFFICE.

RICHARD V. R. SILL, OF DETROIT, MICHIGAN, ASSIGNOR OF ONE-HALF TO STRATHEARN HENDRIE, OF SAME PLACE.

ELECTRIC RAILWAY.

SPECIFICATION forming part of Letters Patent No. 425,911, dated April 15, 1890.

Application filed March 13, 1889. Serial No. 303,110. (No model.)

*To all whom it may concern:*

Be it known that I, RICHARD V. R. SILL, of Detroit, in the county of Wayne and State of Michigan, have invented a new and useful Improvement in Electric Railways, of which the following is a specification.

My invention consists in an improvement in electric railways designed to operate with an alternating current, hereinafter described and claimed.

Figure 1 is a side elevation, and Figs. 2 and 3 are end elevations, of a device for automatically closing and breaking the circuits. Fig. 4 is a plan view of a track carrying a motor, and Fig. 5 is a diagram plan of a portion of a railway-track fitted with my invention.

To avoid danger of shocks to persons in the immediate vicinity of the car when an alternating current is used, the potential of the current is reduced before it passes to the rails by a converter placed between the tracks, and the potential of the current is again increased before it passes to the motor by a converter placed upon the car.

2 is a wire running the entire length of the track between the rails and connected at one end to one brush or collector of the dynamo, and 3 is a similar wire parallel to the wire 2 and connected to the other brush or collector of the dynamo.

12 and 13 are converters, one of which is placed between each pair of opposite rails. These converters may be of any known type—for example, such as are used in the Westinghouse system of electric lighting.

When the wires 2 and 3 are not connected, the circuit is incomplete and no current passes; but as soon as said wires are connected a current passes through the connecting-wire and the portion of the wires 2 and 3 which is between the dynamo and said connecting-wire.

31 31 are the uprights, and 32 is the base of the frame of the making and breaking device, and are composed of insulating material.

28 is an electro-magnet extending horizontally between and through the uprights 31 31.

24 and 25 are strips of metal pivoted at 35 and 36 to the metal strip 37 and adapted to oscillate about said pivots. The metal strip 37 extends over and beyond the tops of the uprights 31 31.

34 and 33 are springs adapted to hold the metal strips 24 and 25 away from the magnet 28 when no current is passing through the coil around said magnet.

22 and 23 are strips of metal attached to one of the uprights 31, and 26 27 are similar strips attached to the other one of the uprights 31. From the strip 22 a wire extends to and is coiled around the magnet 28, and is connected with the strip 27. From the strip 23 a wire 10 extends to the wire 2, Fig. 5. From the strip 26 a wire 11 extends through the converter to the wire 3. The wire 7 is connected with the rail 5 and the wire 8 with the rail 6. When the metal strips 24 and 25 are drawn toward the magnet 28, they rest against the strips 23 22 and 26 27, respectively.

The car may be of any desired type having a truck and room to carry an electric motor. The car-wheel 20 is connected by a wire passing through the converter 42 and forming the coil bearing the primary current with the wheel 19. The car-wheel 18 is connected by a wire 17, provided with a resistance-coil 44, with the car-wheel 19. The car-wheel 20 is connected by a wire 16 with the car-wheel 21. Except as just stated, the car-wheels are insulated from each other.

43 is a wire extending through the converter 42, forming the coil in which is generated the secondary current, and also extending through the motor.

Each side of the track is divided into sections, insulated from each other, composed of one or more rails. As shown, each pair of opposite rails constitutes one section. The rails are insulated from each other, except as hereinafter pointed out. A converter 12 13 is placed between opposite rails. Before each converter is placed an instrument 9 of the description shown in Figs. 1, 2, and 3, and hereinbefore described. The two opposite rails are connected by wires 41 39, which wires extend through and form the coils bearing the secondary currents in the converters.

The position and connections of the wires 2 and 3, the connection of the wires 10 and 11 therewith and with the current making and breaking device 9, and the connections of the wires 7 and 8 have been hereinbefore described.

The operation of my invention is as follows: First. Suppose all four wheels of the car to rest upon the rails 4 and 5. The current making and breaking device, which is situated just before the converter 12, is closed by hand, thus closing the connection between the wires 2 and 3 through the wire 45. The wire 45 bears the primary current through the converter 12, which current induces a secondary current of lower potential in the wire 41. The current in the wire 41 passes through the converter 42 upon the car and induces a current of greater potential in the wire 43 43, which passes through the motor.

Second. Suppose the wheel 19 to just rest upon the end of the rail 6, the other wheels resting upon the rails 4 and 5. The current to the rail 4, through the wire 41, will then pass to the wheel 20, through the converter 42, to the wheel 19, where it will be divided, part passing to the wheel 18, through the wire 17, to the track 5, and back to the converter 12, and the other part passing down the wire 8 to the metal strip 27, Figs. 1 and 3, through the magnet 28, out to the metal strip 22, and through the wire 7 to the rail 5, and back to the converter. The current through the wire 41 to the rail 5 takes the reverse course. The current passing around the magnet 28 charges said magnet, which attracts the pivoted strips of metal 24 and 25, and brings them, respectively, into contact with the metal strips 23 24 and 26 27, thus completing the connection between the wires 10 and 11, through the metal strips 23, 24, 37, 25, and 26, and also through the metal strips 23 24 22, the wire 29 30, the metal strips 27 25 26.

Third. Suppose the two forward wheels to rest on the rails 6 and 15 and the two rear wheels on the rails 4 and 5. The connection having been made between the wires 10 and 11, the main current between the wires 10 and 11 is through the metal strips 24 37 25, as described, which strips should have a slight resistance; but a shunt-current will also pass through the wire 29 30, which current will hold the magnet 28 charged and maintain the connection between the wires 10 and 11. The current passing through the wire 11 will generate a secondary current in the wire 39. Said secondary current will pass between the rails 6 and 15, through the car-wheel 21, wire 16, car-wheel 20, and the wire through the converter 42 on the car, to the car-wheel 19 and to the rail 6. When the rear wheel of the car passes from the rail 4 to 5, the circuit, through the wire 41, will be broken, and the current through the wire 45 will therefore cease. The pivoted levers 24 and 25 in the current making and breaking device, which is situated just before the converter 12, will no longer be attracted by the magnet, and the connection between the wire 45 and the wire 2 will be broken.

The above-described operation will be repeated automatically as the car passes each pair of opposite rails.

What I claim as my invention, and desire to secure by Letters Patent, is—

1. In an electric railway, a track electrically divided into sections, two conductors extending along the track and connected at one end with the poles of an alternating-current dynamo, a converter between each section of track having its primary connected in multiple arc with the two conductors and its secondary connected with the opposite rails of its section, and an electro-magnetic switch having four terminals, two of which are connected with the primary of the converter and the other two with two adjacent track-sections, substantially as and for the purposes set forth.

2. In an electric railway, a track electrically divided into sections, two conductors extending from the poles of an alternating-current dynamo along the track, a converter in each track-section having its primary coil connected with the two conductors and its secondary connected with the opposite rails of its section, a circuit-breaker having four terminals, two of which are connected with the primary of the converter and the other two with adjacent track-sections, and a motor having its poles in electrical connection with the rails, substantially as and for the purposes set forth.

3. In an electric railway, a car having its wheels insulated from their axles, a converter on the car having its primary connected with two diagonal wheels of the car and its secondary with the poles of an electric motor, substantially as shown and described.

4. In an electric railway, the combination, with a track electrically divided into sections, of the conductors 2 and 3, the converter 13, having its primary 10 and 11 connected with the conductors 2 and 3, and the circuit breaker or switch 9, having its terminals 23 and 26 connected with the primary 10 11, and its terminals 22 and 27 connected, respectively, with adjacent track-sections, substantially as shown and described.

5. In an electric railway designed to operate by an alternating current, a track electrically divided into sections, a converter adapted to reduce the potential of the current connecting each section with the main conductors, a circuit-breaker having terminals connected with the primary of said converter and terminals connected with two adjacent track-sections, and a converter adapted to increase the potential of the current connected with the track and with a motor, substantially as and for the purposes set forth.

RICHARD V. R. SILL.

Witnesses:
ADELAIDE A. ANDERSON,
GEO. H. LOTHROP.